United States Patent [19]

Hradel

[11] 4,381,035

[45] * Apr. 26, 1983

[54] SIMULTANEOUS RECOVERY OF THERMAL VALUES AND ORGANIC MATERIALS FROM SOLID CARBONACEOUS FUELS AND WASTE DISPOSAL PROCESS

[76] Inventor: Joseph R. Hradel, 6482 S. Mission Rd., Mount Pleasant, Mich. 48858

[*] Notice: The portion of the term of this patent subsequent to Jun. 16, 1998, has been disclaimed.

[21] Appl. No.: 257,962

[22] Filed: Apr. 27, 1981

Related U.S. Application Data

[63] Continuation-in-part of Ser. No. 123,940, Feb. 25, 1980, Pat. No. 4,273,191.

[51] Int. Cl.$^3$ .................... E21B 43/26; E21B 43/27
[52] U.S. Cl. .................... 166/307; 44/1 B; 44/1 G; 166/267; 166/271; 166/308; 208/8 LE
[58] Field of Search ............ 44/1 B, 1 G; 166/271, 166/266, 267, 272, 303, 304, 305 R, 307; 208/8 LE; 299/4, 5

[56] References Cited

U.S. PATENT DOCUMENTS

| | | | |
|---|---|---|---|
| 1,702,899 | 2/1929 | Howard | 208/8 LE |
| 2,223,184 | 11/1940 | Pier et al. | 299/5 X |
| 2,476,999 | 7/1949 | Orchin | 208/8 LE |
| 2,670,317 | 2/1954 | Adams | 208/8 LE X |
| 3,764,547 | 10/1973 | Schlinger et al. | 208/8 LE X |
| 3,929,193 | 12/1975 | Duke | 166/303 |
| 4,032,428 | 6/1977 | Johnson | 208/8 LE |
| 4,057,399 | 11/1977 | Cole et al. | 44/1 B X |
| 4,250,964 | 2/1981 | Jewell et al. | 166/305 R X |
| 4,273,191 | 6/1981 | Hradel | 166/305 R |

FOREIGN PATENT DOCUMENTS

| | | | |
|---|---|---|---|
| 493447 | 10/1938 | United Kingdom | 208/8 LE |
| 498466 | 1/1939 | United Kingdom | 44/10 H |

OTHER PUBLICATIONS

Blackwell et al., "Review of Kraft Foul Condensates", Tappi, vol. 62, No. 10, Oct. 1979, pp. 33-37.

*Primary Examiner*—Stephen J. Novosad
*Assistant Examiner*—George A. Suchfield
*Attorney, Agent, or Firm*—C. Kenneth Bjork

[57] ABSTRACT

A process for recovering thermal values and organic materials from solid carbonaceous fuels, i.e., bituminous coals and lignites, by contacting such fuels with waste foul condensates, known as black liquor, from pulping operations thereby to solubilize thermal value containing organic materials therefrom and simultaneously provide a use for the heretofore considered unusable black liquors, the disposal of which up to now has presented both an economical and ecological problem.

7 Claims, No Drawings

SIMULTANEOUS RECOVERY OF THERMAL VALUES AND ORGANIC MATERIALS FROM SOLID CARBONACEOUS FUELS AND WASTE DISPOSAL PROCESS

REFERENCE TO RELATED APPLICATION

This application is a continuation-in-part of application Ser. No. 123,940 filed Feb. 25, 1980, now U.S. Pat. No. 4,273,191.

BACKGROUND OF THE INVENTION

1. Field of the Invention

The present invention relates to a novel method for effecting recovery of thermal values and production of organic materials, primarily paraffinic and non-paraffinic hydrocarbons, from solid carbonaceous fuels, i.e., bituminous coals and lignites, hereinafter at times collectively referred to as coals, by contacting such masses with foul condensates, i.e., black liquors, from pulping operations thereby unexpectedly solubilizing such materials (hereinafter generally referred to as thermal values) comprising and/or bound up in such coals.

2. Description of the Prior Art

Waste foul condensates, commonly called black liquors because of their dark color, result as an undesirable waste by-product from paper mill operations, both Kraft and non-kraft. Generally, these liquors are the condensate from evaporators and surface condensers associated with pulp digesters. These liquors heretofore have had no recognized use and their disposal in itself has been and continues to be an ever increasing problem. In the past, these liquors have been diverted into streams, rivers and lakes where they have given an undesirable dark color to the water body, imparting an objectionable odor and taste to the water and tainting the flesh of the fish and other edible life inhabiting such lakes, rivers and streams. Recent strengthening of environmental impact regulations has placed an ever increasing burden on mill operators to legally and properly dispose of such waste liquors by other means.

Recently, in the United States, mills have been recycling the black liquors, which contain about 10 percent organics, to cookers until the liquors are condensed to a mass containing about 65 percent organics with the balance being inorganic matter and residual water. This mixture then ordinarily is subjected to combustion on a fluidized bed to remove the organic matter, but this process of waste disposal has been beset with problems.

Blackwell, MacKay, Murray and Oldham, "Review of Kraft Foul Condensates", Tappi, Volume 62, No. 10, October 1979, summarizes the sources, quantities, chemical composition and environmental effects of such liquors and presents an extensive bibliography of the published literature about such waste liquors and the problems they present, particularly when the liquors are introduced into fresh water bodies and streams for disposal.

U.S. Pat. Nos. 1,823,440; 3,629,105; 3,766,077; 3,849,328 and 4,157,115 and Shreve, N. R., *Chemical Process Industries*, Third Edition, 1967, McGraw-Hill, Inc., pages 626, 628, and 635–638, were cited during prosecution of the parent application referenced hereinbefore. None of these relates to the recovery of organic materials from coals or suggests the present process.

Applicant is unaware of any literature or patent publications in any way related to or suggesting any practical use of waste foul condensate for effecting recovery of thermal values and organic materials from coals.

SUMMARY OF THE INVENTION

In general, the novel process of the present invention comprises treating a bituminous coal or lignite with a black liquor, the liquor being employed in an amount sufficient to solubilize or otherwise chemically dissolve or affect organic components of the coal, thereby freeing these values from residual, non-combustible inorganic ash components and providing the organic values in a liquid carrier whereby they readily can be separated from the residual solids. The resulting solution itself is directly suitable for use directly as a fuel or the solubilized thermal values can be recovered therefrom and otherwise used as, for example, in the production of synfuels or petrochemicals.

In the practice of the present invention, a black liquor is brought into intimate contact with or forced through a previously mined coal or a coal seam or stratum formation at atmospheric or superatmospheric pressure. Thermal value freeing action is realized when any quantity of the active components in the liquor contact the coal. However, because of the favorable economics accompanying the use of the waste black liquors, conveniently volumes containing quantities of the active components in excess of that required to free up the thermal values are used. This excess has no detrimental effect on the thermal values or their release from the coal mass carrying it.

An advantage of the present process is that it can be practiced both on mined coals or in solution mining of coal bearing strata. In this latter embodiment, there is provided simultaneously the underground utilization of the coal bearing strata as a way of directly using waste liquor and effecting recovery of thermal values by dissolution of such from coal seams too thin or deep or otherwise difficult to mine safely and efficiently by conventional mining techniques. In solution mining operations by the present process, the waste liquor can be pumped down a feed well and the thermal value product recovered through recovery wells following recognized practices. Additional advantages offered by the solution mining embodiment, with the single exception of coking coals, include reduction in capital investment, elimination of explosion, rockfall and black lung hazards accompanying conventional mining techniques and movement of the recovered thermal values by pipeline rather than by rail.

Another advantage is that coal dust and fines containing wash water from the washing of mined coals can be treated with black liquor to remove the organics therefrom, thus achieving further recovery of thermal values and organics which heretofore have been lost, and at the same time cleaning up the wash water which up to now has been troublesome to dispose of because of its color and solids content.

Black liquor produced from paper pulping operations generally contains from about 300 to 400 kilograms of organic components per metric ton (kg/MT) of condensate, and on the average about 350 kilograms per metric ton. Typically, these components comprise a multiplicity of alcohols (about seven different species), ketones (about six), in the neighborhood of twenty terpenes, approximately seven organic sulfur compounds, about ten phenolic compounds, as many as five organic acids, about six organic gases plus several other organic materials, such as furans, toluene or other aralkyl hydrocarbons, and liquid hydrocarbons ranging from $C_{10}$ to $C_{16}$ in carbon content. The actual number and types of these components in a given black liquor may vary somewhat from the typical composition described herein, depending on the origin of the pulp and the nature and condition of pulp treatment and digestion. However, in general, the black liquors are comprised of a composition approximating that described herein.

These components which make up the solute or suspended matter in admixture in the aqueous based black liquor are too difficult to economically separate or recover and heretofore have not been usefully employed. In fact, as set forth in the description of the prior art, the disposal of this by-product waste liquor has been and continues to be an increasing problem to the paper mills.

Now, unexpectedly, I have discovered that the components of black liquor provide a unique blend and composition of active ingredients which, in combination, bring about surfactant, solubilizing, detergent and acidizing effects on both paraffinic and non-paraffinic thermal value organics in solid carbonaceous fuels, thereby freeing these from inorganics present therein.

An unexpected result of the present process is that when the end product, i.e., the waste liquor containing the solubilized thermal values from the coal, is burned, there is a much lower acrid combustion odor than when the original coal itself is burned. This seems to indicate that the sulfur present in the fluid extraction product is that which only is organic in nature as present in the coal and that which the black liquor sacrificed to the coal in the solution process. This could provide a tremendous impetus to the use of high sulfur coal by industry since the greatest portion of the sulfur content of such coals appears to be inorganic in the form of sulfides, sulfites and sulfates which would be left behind in the solid residue, i.e., ash, or in the formation if solution mining is employed.

By the practice of the present invention, a number of other distinct advantages and uses are realized. The costly black liquor disposal problem for paper mills can be eliminated and enhanced fuel and chemical production readily can be realized from our national coal reserves, thus solving a problem for the paper mill industry, the coal industry and the Department of Energy. Further, in these times of energy crises because of our dependency on foreign crude and ever increasing costs of doing business from imposed regulations and controls restricting the use of known carcinogens and the carefully watched disposal of wastes, the practice of the present invention offers a single operable solution to a number of major problems.

DESCRIPTION OF PREFERRED EMBODIMENTS

In one preferred embodiment of the present invention, a black liquor is brought into intimate contact with a porous, highly particulated mass of mined butuminous coal or lignite. Conveniently, an amount of black liquor, ranging on a weight basis of from about that of the coal, and preferably from about 110 percent to a large excess of the coal mass is employed. Generally, the black liquor is circulated in a closed reactor system at a temperature ranging from about 5° C. up to about 20° C., and conveniently at about room temperature, for an extended period to dissolve thermal values away from non-soluble inorganics present in the raw coal or lignite. Since the dissolution rate varies with temperature and applied pressure, more rapid recovery of the organic products are realized at the higher temperatures, super-atmospheric pressures and with greater particulation of the coals. This is why the present process is particularly effective on recovering thermal values from finely divided coal dusts carried in wash waters from the washing of mined coals.

Alternatively, if time is not of importance, good product recovery is realized by placing a coal in contact with the waste liquor and permitting these to stand at room temperature and normal pressure, with or without agitation. Although thermal value release from the coal is slower when following this embodiment, the dissolution proceeds without requiring energy for heating the reaction mass or providing external pressure.

In another preferred embodiment, black liquor is pumped, or otherwise injected, into a fractured or natural coal bearing formation to achieve solution mining of the oils with recovery using recognized return well or other solution mining procedures. If the black liquor is injected, as by pumping under high pressure with mechanical high pressure pumps or by hydraulic force or gas pressure into the coal at a high pressure, formation fracturing occurs at the same time and the solution mining process is enhanced. In such an operation, the quantity of pressure to be used in the pumping action to achieve formation fracture readily is calculated knowing the depth of injection. The minimum pressure required is that calculated to lift the earth cap between the injection site and surface.

An advantageous facet of the present invention resides in the fact that in such solution mining operations, with or without fracturing, the quantity of liquor employed is such that the amount of the active components present therein, which act on the coals to free thermal values therefrom, is more than sufficient to physically or chemically react with these to free the thermal values for recovery.

In some operations, it is recognized, following the thermal value recovery operation from coals, that a quantity of product liquid will remain. However, even in these instances, there is the advantage that the nature of the original black liquor is changed in a positive manner to provide for more ready disposal of the liquor. By the incorporation of the thermal values therein, the resulting product can be used directly as a fuel to derive thermal energy values therefrom without having to resort to further evaporation or other means of water removal for concentrating the products. However, if the freed thermal values are to be recovered, this can be done and the residual liquid-solid mass remaining after the thermal values have been recovered therefrom can be solidified by evaporation with gums or resins to provide a readily storable solid waste, which could be used for construction fill or other land reclamation use. The recovered thermal value product can be used as feedstock for synfuel production or the preparation of petrochemicals.

The following non-limiting example further illustrates the present invention.

EXAMPLE

Multiple samples of a predetermined weight of a bituminous coal or lignite were placed in glass jars and black liquor, in an excess amount of the weight of the coal or lignite sample, added to each jar. The jars were sealed and maintained at about room temperature. At predetermined time intervals, samples were removed from test and the residual solids separated from the black liquor product mass. The solids were dried and weighed, the loss in weight reflecting the amount of thermal value organic materials of the coal which had been solubilized.

Plotting percent weight loss of sample against time on test, and based on known ash content of the coal or lignite, the results of this study indicate that substantially complete dissolution of organic thermal values occurs at about 40 days for a Texas lignite having a residual ash of about 12.4 percent of the coal weight, about 75 days for a Wyoming lignite having a 7.7 percent ash content and for a common bituminous coal having a 7 percent ash content at about 360 to 380 days. The resulting liquid product mass exhibits pumpability and upon combustion gives a less acrid fume than results from burning of the original coal or lignite.

As the dissolution process continued during the test, the residual solids became crumbly, thus further aiding the release of carbonaceous materials to the black liquor.

I claim:

1. A process for recovering thermal values and producing organic materials from a solid carbonaceous fuel wherein said fuel is a bituminous coal or a lignite which comprises treating said solid carbonaceous fuel with a black liquor thereby effecting release of said thermal value organic materials from said fuel.

2. The process as defined in claim 1 wherein the solid carbonaceous fuel is a mined, porous, particulated bituminous coal.

3. The process as defined in claim 1 wherein the solid carbonaceous fuel is a mined, porous, particulated lignite.

4. The process as defined in claim 1 wherein the solid carbonaceous fuel comprises coal in its original formation and including the step of injecting the black liquor into the coal bearing formation thereby to achieve solution mining of thermal value organic materials of said coal with simultaneous disposal of said black liquor.

5. The process as defined in claim 4 wherein the black liquor is injected into said formation at a pressure sufficient to fracture the coal.

6. The process as defined in claim 4 wherein the coal bearing formation is too thin or deep to mine by conventional techniques.

7. The process as defined in claim 1 wherein the solid carbonaceous fuel is a finely particulated coal present in the wash water resulting from the washing of mined coal.

* * * * *